United States Patent [19]

Termuehlen

[11] Patent Number: 5,809,783
[45] Date of Patent: Sep. 22, 1998

[54] METHOD AND APPARATUS OF CONVERSION OF A REHEAT STEAM TURBINE POWER PLANT TO A NON-REHEAT COMBINED CYCLE POWER PLANT

[75] Inventor: Heinz Termuehlen, Nokomis, Fla.

[73] Assignee: Siemens Power Corporation, Richland, Wash.

[21] Appl. No.: 748,648

[22] Filed: Nov. 14, 1996

Related U.S. Application Data

[62] Division of Ser. No. 495,012, Jun. 27, 1995, Pat. No. 5,660,037.

[51] Int. Cl.$^6$ .................................................. F01K 13/00
[52] U.S. Cl. ............................................ 60/646; 60/657
[58] Field of Search ................................. 60/646, 657

[56] References Cited

U.S. PATENT DOCUMENTS

| | | | |
|---|---|---|---|
| 4,080,790 | 3/1978 | Oberle | 60/646 |
| 4,598,551 | 7/1986 | Dimitroff, Jr. et al. | 60/646 |
| 5,201,180 | 4/1993 | Girbig | 60/646 |

*Primary Examiner*—Noah P. Kamen
*Attorney, Agent, or Firm*—Ira Lee Zebrak, Esq.

[57] ABSTRACT

A method and apparatus is disclosed for converting a reheat steam turbine plant to a non-reheat, combined cycle plant without requiring internal modification of the steam turbine unit. A reheat steam turbine power plant with a boiler and a steam turbine with a plurality of turbine sections, receiving steam under pressure and successively expanding the steam through the turbine sections, is converted to a non-reheat combined cycle plant by replacing the boiler with a dual-pressure heat recovery steam generator capable of producing main steam and secondary steam at differential temperature and pressure and by installing a trimming system to allow adjustment of the pressure drop between the exhaust of the first turbine section and the inlet of the second turbine section to prevent damage to the turbine blades. The non-reheat cycle plant may also be operated with secondary steam supplied at the inlet of the final turbine section to reduce the moisture content of the steam thereby preventing excessive wear on the turbine blades.

6 Claims, 4 Drawing Sheets

METHOD AND APPARATUS OF CONVERSION OF A REHEAT STEAM TURBINE POWER PLANT TO A NON-REHEAT COMBINED CYCLE POWER PLANT

This application is a division of Ser. No. 08/495,012, filed Jun. 27, 1995 now U.S. Pat. No. 5,660,037.

FIELD OF THE INVENTION

The present invention relates to the conversion of a steam turbine-generator power plant from a reheat cycle turbine system to a non-reheat combined cycle turbine system, comprising both gas turbine and steam turbine units. In particular, the present invention relates to a method and apparatus for conversion of a steam turbine plant from a reheat cycle to a non-reheat combined cycle, using a heat recovery steam generator for providing main steam and secondary steam, without requiring internal modification of the steam turbine unit.

BACKGROUND OF THE INVENTION

Steam turbine power plants of a variety of configurations are generally known in the art. According to a known embodiment, the steam plant comprises a boiler, which evaporates feedwater into main steam at high temperature and high pressure (superheated steam), and a turbine unit comprising one or more sections and stages through which the steam is gradually expanded at decreasing pressures in order to power an electric generator. One typical embodiment in the prior art also includes one or more feedwater heaters that use steam extracted from one or more turbine stages or sections (a portion of the main steam flow through the turbine) to preheat the feedwater supplied to the boiler and evaporated into steam, in order to improve the overall thermal efficiency of the plant.

In one commonly known embodiment the steam plant operates on a reheat cycle where, after partial expansion through a higher pressure turbine section, steam is returned to a separate section of the boiler (commonly designated the reheater) where it is resuperheated (or "reheated") before being delivered to the next lower pressure turbine section as reheat steam. Reheating, whereby the reheat steam is returned to the next lower pressure turbine section at a higher temperature and enthalpy, is a generally accepted practice in nearly all larger steam plants to improve thermal efficiency. However, steam turbine plants employing reheat cycles and feedwater preheating systems require additional, more complicated piping, instrumentation and other systems.

Also known in the art is the so-called combined cycle plant, which combines a gas-turbine cycle with a steam-turbine cycle, each to power an electric generator. The combined cycle plant allows gains in thermal efficiency that are much larger than to those that may be obtained from reheating in a reheat cycle steam turbine plant. Accordingly, it would be advantageous to convert a reheat cycle plant to a non-reheat combined cycle plant.

The conversion of a reheat cycle steam plant to a combined cycle plant allows the elimination of the complicated reheat system but still improving the thermal efficiency, while reducing costs and providing a plant that is much easier to operate than a combined cycle plant with a reheat cycle. Typically, the conversion of a steam plant to a combined cycle plant requires the elimination of the intricate feedwater preheater system, which also simplifies the operation of the plant.

The elimination of the feedwater preheater system, with its various feedwater preheat steam extractions, however, reduces the total mass flow of steam through the various turbine sections and stages. The reduction in steam mass flow in the converted combined cycle plant may not be compatible with design limitations of one or more turbine sections in the original reheat cycle plant.

Thus the conversion of a reheat steam plant to operate as a non-reheat combined cycle plant may require the costly internal modification of the steam turbine system.

Accordingly, it would be advantageous to convert a reheat steam plant to a non-reheat combined cycle plant without requiring internal steam turbine modifications.

SUMMARY OF THE INVENTION

The present invention relates to the conversion of a steam plant to a combined cycle power plant from a reheat to a non-reheat steam cycle. When a reheat steam plant is repowered, the reheat steam generator (boiler) may be replaced by a dual-pressure non-reheat heat recovery steam generator. The elimination of the reheat system reduces costs and provides a plant that is much easier to operate. The present invention discloses a method and apparatus to change a steam plant from a reheat steam cycle to a non-reheat combined cycle without internal steam turbine modifications.

The present invention relates to a method for converting to a non-reheat combined cycle a reheat steam turbine power plant with a boiler and a steam turbine with a plurality of turbine sections, which receives steam under pressure and successively expands the steam through the turbine sections, including the steps of replacing the boiler with a dual-pressure heat recovery steam generator capable of producing main steam and secondary steam at differential temperature and pressure and installing a trimming system to allow adjustment of the pressure drop between the exhaust of the first turbine section and the inlet of the second turbine section. The present invention also relates to a method for operating a non-reheat combined cycle power by use of the trimming system.

The present invention also relates to a trimming system including a pressure regulator to selectively adjust a portion of the total pressure drop between the exhaust of the first turbine section and the inlet of the second turbine section.

DETAILED DESCRIPTION OF THE PREFERRED EMBODIMENTS

Figures 1A, 1B:
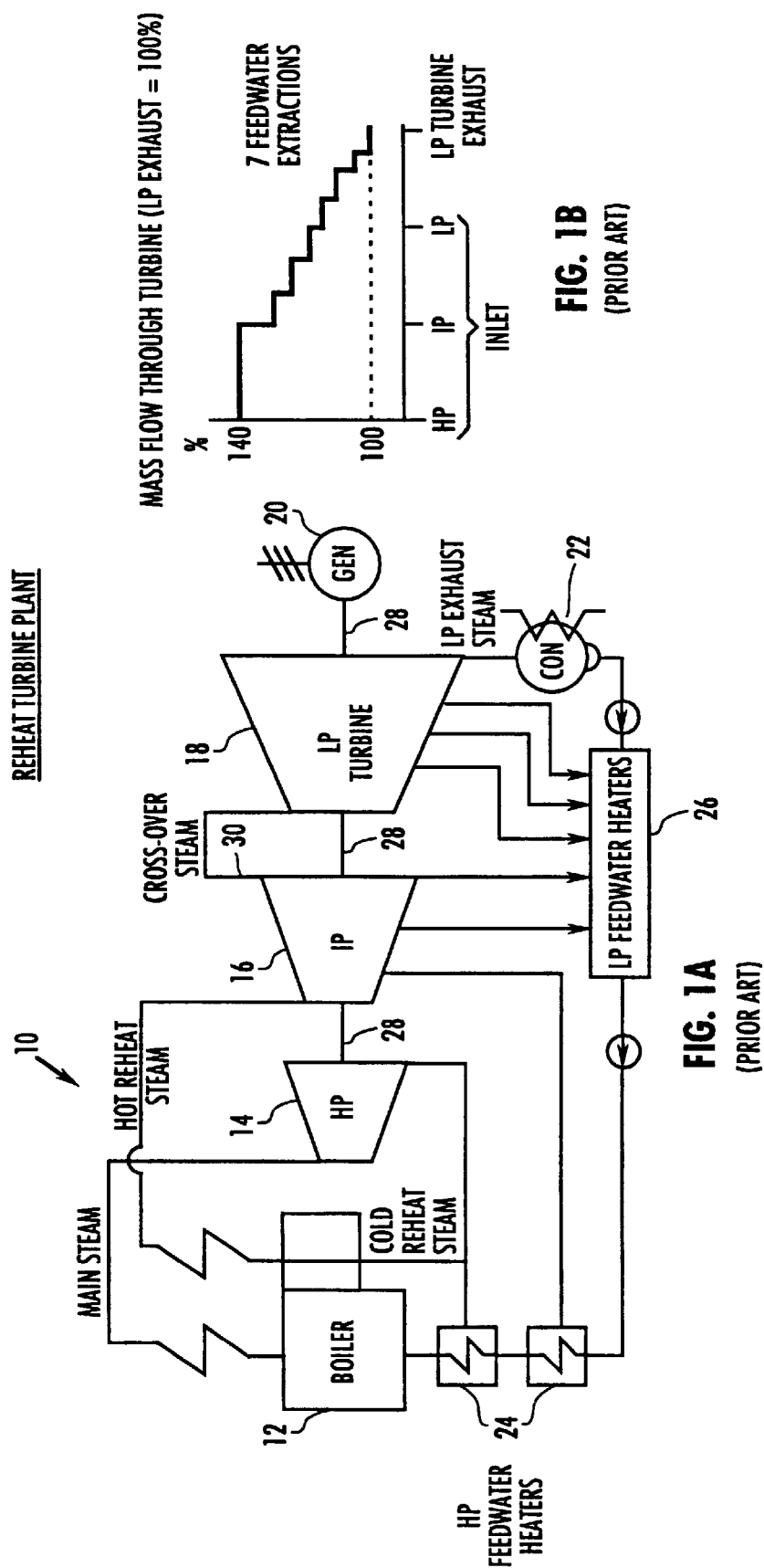
FIG. 1A is a schematic diagram showing the basic configuration of a reheat steam turbine plant in the prior art.
FIG. 1B is a graphical depiction of the percent steam mass flow through the reheat steam turbine plant shown in FIG. 1A (wherein LP turbine exhaust represents 100% of the mass flow)

A typical reheat steam turbine plant 10 is shown in FIG. 1A. The reheat plant 10 comprises a boiler 12, a high pressure (HP) turbine section 14, an intermediate pressure (IP) turbine section 16, a low pressure (LP) turbine section 18, an electric generator 20, a condenser 22, one or more HP feedwater heaters 24, and one or more LP feedwater heaters 26. Each turbine section is connected to electric generator 20 by shaft 28.

The reheat plant 10 basically functions within a closed feedwater/steam loop. Feedwater is supplied to boiler 12, where it is evaporated into main steam and supplied to the inlet of HP turbine section 14. In HP turbine section 14, the main steam passes through one or more turbine stages, where it is partially expanded to power electric generator 20, to the exhaust of HP turbine section 14. At the HP turbine section exhaust a portion of the main steam is returned as cold reheat steam to boiler 12, where it is resuperheated in a separate boiler section; a portion of the main steam is also extracted and delivered to a HP feedwater heater 24 for purposes of preheating feedwater supplied to boiler 12. After being resuperheated in the reheat section of boiler 12, the reheat steam is returned to the inlet of IP turbine section 16.

The reheat steam then passes through one or more stages of IP turbine section 16, where it is further expanded to power electric generator 20. After the initial expansion stage, a portion of the steam is extracted and delivered to a HP feedwater heater 24 for purposes of preheating feedwater to boiler 12. After partial expansion in other stages of IP turbine section 16, additional portions of the steam are successively extracted and delivered to a series of LP feedwater heaters 26.

Cross-over steam is delivered through cross-over pipe 30 from the exhaust of IP turbine section 16 to the inlet of LP turbine section 18. The cross-over steam then passes through one or more expansion stages of LP turbine section 18 to power electric generator 20. As the steam passes through the various stages of LP turbine section 18, additional portions of the expanding steam are successively extracted and delivered to a series of LP feedwater heaters 26, for purposes of preheating the feedwater supply to boiler 12.

Ultimately, steam that has been fully expanded through the turbine system is expelled from the exhaust of LP turbine section 18 to condenser 22 where, condensed into a liquid, it passes through LP feedwater heaters 26, HP feedwater heaters 24, and into boiler 12, where it is once again evaporated into main steam and re-supplied to the various turbine sections for powering electric generator 20, completing the steam cycle.

Figures 2A, 2B:
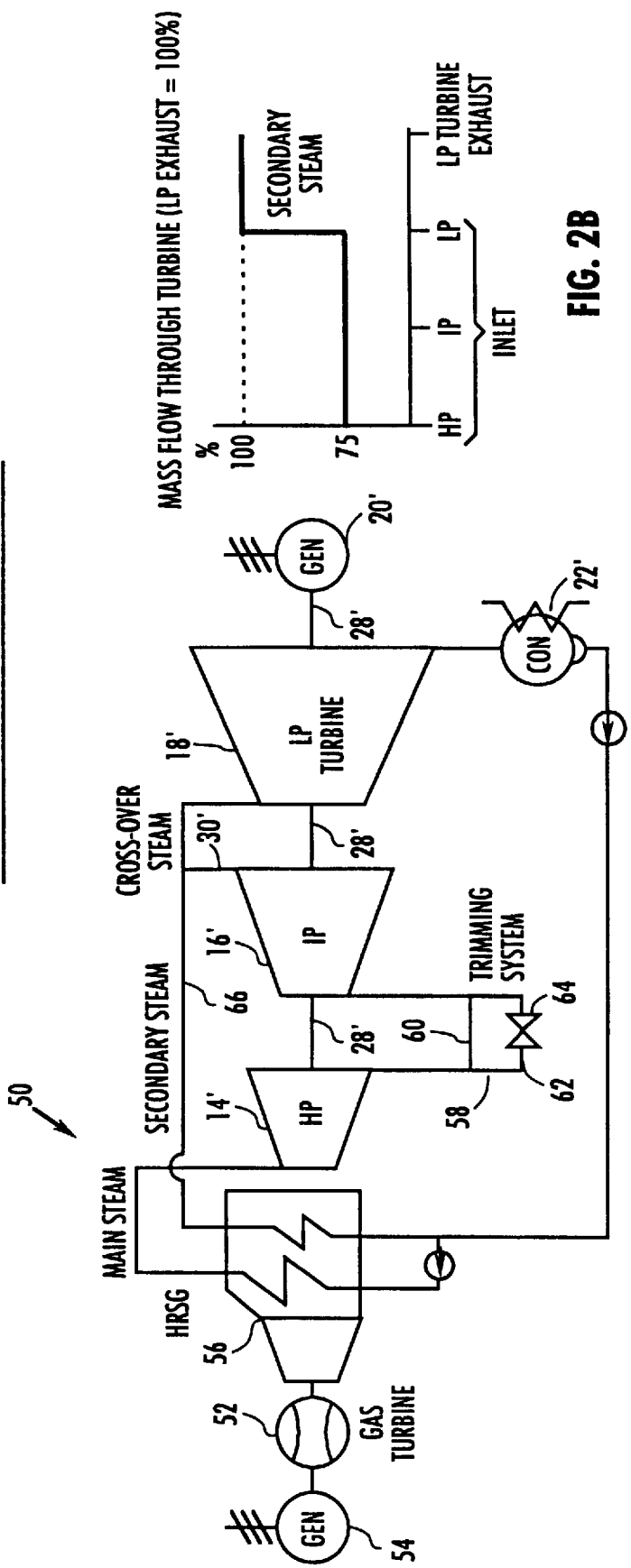
FIG. 2A is a schematic diagram showing the basic configuration of a non-reheat combined cycle turbine plant including the present invention.
FIG. 2B is a graphical depiction of the percent steam mass flow through the non-reheat combined cycle turbine plant shown in FIG. 2A (wherein LP turbine exhaust represent 100% of the mass flow)

A non-reheat, combined cycle power plant 50 incorporating an embodiment of the present invention is shown in FIG. 2A. The combined cycle plant 50 includes a gas turbine 52, which powers associated gas-turbine (electric) generator 54. Combined cycle plant 50 also includes a heat recovery steam generator 56 (in place of boiler 12 in reheat steam turbine power plant 10). The combined cycle plant as shown in FIG. 2A further includes a high pressure (HP) turbine section 14', an intermediate pressure (IP) turbine section 16', a low pressure (LP) turbine section 18', a steam turbine (electric) generator 20', and a condense 22'. Each turbine section is connected to electric generator 20' by shaft 28'.

As shown by comparison of FIG. 1A with FIG. 2A, combined cycle plant 50 does not include a feedwater preheater system or feedwater preheaters as does reheat plant 10. Because combined cycle plant 50 does not include a feedwater preheater system, there are no steam extractions for feedwater preheating. Moreover, because combined cycle plant 50 does not operate with reheated steam, none of the main steam is redirected to a boiler (or steam generator) from the exhaust of HP turbine section 14'.

Referring to FIGS. 1B and 2B, because the conversion of a reheat steam cycle plant to a combined cycle plant requires the elimination of the feedwater preheater system there must be an adjustment of steam mass flow rate. (For purposes of illustration and comparison, the LP turbine section exhaust is treated as 100% of steam mass flow in both reheat plant 10 and combined cycle plant 50, as shown in FIGS. 1B and 2B). In reheat plant 10, assuming that the various feedwater steam extractions total about 40% of the 100% LP turbine section exhaust steam flow, the main steam flow to HP turbine section 14 is 140%. As shown in FIG. 1B, in reheat plant 10, the steam mass flow gradually decreases from 140% at the HP turbine section inlet to 100% at the LP turbine exhaust.

In combined cycle plant 50, if the LP turbine section flow cannot be increased because of LP turbine section design limitations, then the main steam flow to HP turbine section 14' has to be reduced from 100% to 75% for combined cycle operation, because 25% of secondary steam is provided at the LP turbine section inlet. (While more or less secondary steam may be provided, in the exemplary preferred embodiment shown in FIGS. 2A, 2B AND 3B the optimum is about 25%). As shown in FIG. 2B, in combined cycle plant 50 the steam mass flow increases from 75% at the HP turbine section inlet to 100% at the LP turbine inlet, when secondary steam is supplied. Accordingly, as in reheat plant 10, the steam mass flow at the LP turbine section exhaust is 100%, as shown in FIGS. 1B and 2B.

Figure 3A:
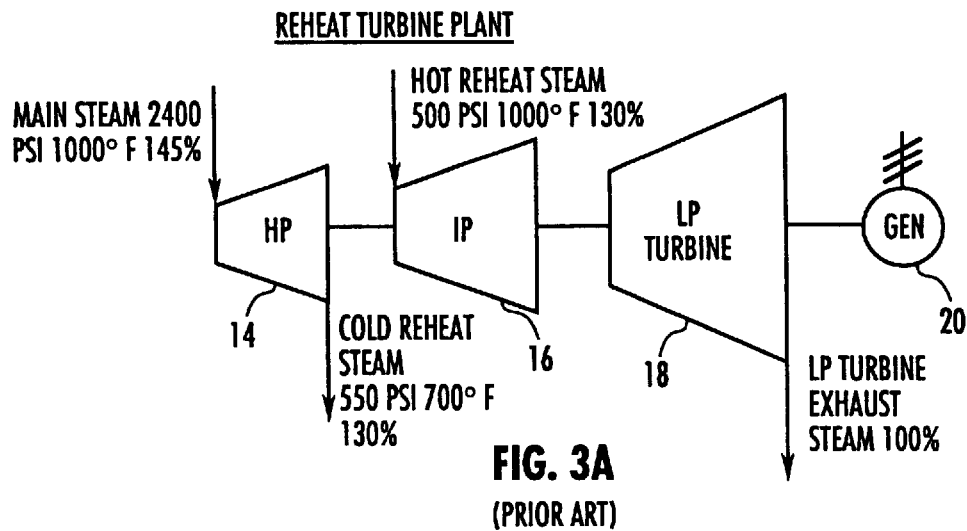
FIG. 3A is a schematic diagram showing the flow of steam in a reheat steam turbine plant.
Figure 3B:
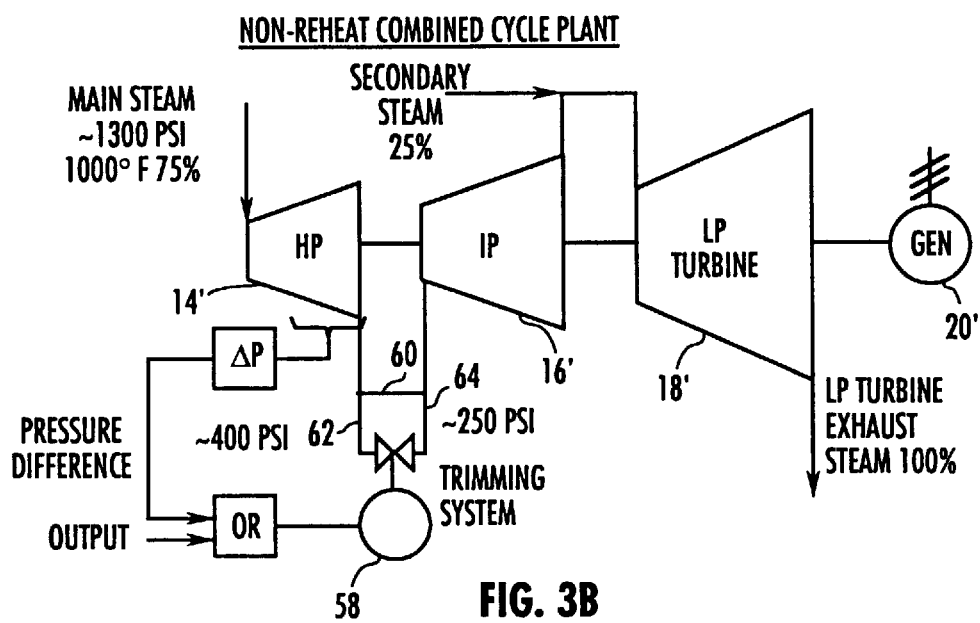
FIG. 3B is a schematic diagram showing the flow of steam in a non-reheat combined cycle turbine plant.

When adjusting steam conditions for proper steam turbine operation after conversion from a reheat cycle to a non-reheat combined cycle, the volumetric steam flow conditions within the various turbine sections should be matched. Referring to FIGS. 3A and 3B, the operating conditions for an exemplary preferred embodiment of a conversion from reheat plant 10 to combined cycle plant 50 is shown for purpose of illustration. (The example shown is not intended to limit the scope of the present invention, which can be implemented over a wide range of operating conditions). In the conversion, the volumetric main steam flow conditions are matched by reducing the main steam pressure for the reheat cycle in reheat plant 10 from about 2400 psi (see FIG. 3A) to approximately 1300 psi for combined cycle operation in non-reheat combined cycle plant 50 (see FIG. 3B), to compensate for the reduced steam mass flow. Keeping the volumetric flow unchanged provides optimal performance without overstressing any turbine blading. Optimal performance is obtained with unchanged volumetric flow.

Notwithstanding with these changed operating conditions from reheat plant 10, combined cycle plant 50 also basically functions within a closed feedwater/steam loop. Feedwater is supplied to heat recovery steam generator 56, where it is evaporated into main steam and supplied to the inlet of HP turbine section 14'. In HP turbine section 14' the main steam passes through one or more stages, where it is partially expanded to power electric generator 20', to the exhaust of HP turbine section 14', at which a portion of the exhaust steam is directed to trimming system 58.

Trimming system 58 compensates for the effects on IP turbine section inlet conditions by the change in steam mass flow and the change in steam pressure and temperature, due to its throttle effect. Because of the different mass flow and temperature, the non-reheat combined cycle IP turbine section inlet pressure is 30% to 50% lower than the pressure of the original reheat cycle. This lower pressure can lead, at high loads, to undesirable stress levels in the last HP turbine section stages, which stress levels may cause damage to turbine blades. Trimming system 58 avoids such overstressing of the HP turbine section blades by allowing the adjustment of pressure drop between the HP turbine section exhaust and the IP turbine section inlet. Proper design and adjustment of trimming system 58 can establish an unchanged back pressure on HP turbine section 14'.

In one preferred embodiment, shown in FIG. 3B, trimming system 58 includes a fluid circuit having connection pipe system 60 and bypass pipe system 62. Pipe system 60 connects the exhaust of HP turbine section 14' to the inlet of IP turbine section 16'; pipe system 62 forms a bypass along pipe system 60; a pressure regulator such as adjustable valve 64 is contained along bypass pipe system 62. During low-load operation valve 64 is completely open. Both pipes included in pipe systems 60 and 62 can be small in size to provide about the same pressure drop (10%) in combined cycle plant 50 as in the original reheat cycle of reheat plant 10.

At high load, as a function of output or pressure difference in the HP turbine section last stage or stages, valve 64 starts to close and consequently increases the pressure drop between the HP turbine section exhaust and the IP turbine section inlet. If both pipe systems 60 and 62 have been equally sized with valve 64 open, the pressure drop would approximately quadruple as the flow in pipe system 60 would double when valve 64 is closed. An increase to about 30% pressure drop could be sufficient to protect the HP turbine section last stage blades from overstressing. Valve 64 controls the delta pressure (pressure drop) in HP turbine section 14 by closing at a set maximum level.

Since only one of pipe systems 60 and 62 in trimming system 58 has a valve, the system is a fail safe device because the connection from HP turbine section 14' to IP turbine section 16' cannot be totally closed which otherwise could cause damage to all or part of the turbine system. In this embodiment, trimming system 58 includes two connection pipes 60 and 62. Only pipe 62 contains a valve and therefore the system is mechanically designed to provide a minimum opening at all times.

In combined cycle plant 50, steam next passes from trimming system 58 through the one or more stages of IP turbine section 16', where it is further expanded to power electric generator 20'. Cross-over steam is delivered from the exhaust of IP turbine section 16' to the inlet of LP turbine section 18'. In addition, secondary steam is provided directly from heat recovery steam generator 56 to the inlet of LP turbine section 18' through a fluid conduit such as secondary steam pipe 66. For an optimal non-reheat cycle efficiency, heat recovery system generator 56 should be designed as a dual-pressure unit. As shown in the embodiment of combined cycle plant 50 depicted in FIG. 2A, heat recovery steam generator 56 is a dual pressure unit, which supplies both main steam and secondary steam, each produced in a separate section and at different pressure levels.

The introduction of secondary steam compensates for the increased moisture content of the steam at the LP turbine section exhaust, which may lead to an increase of droplet erosion at the last stage turbine blades, when changing from a reheat cycle to a non-reheat cycle. This increase in moisture content of the steam is especially critical for full load operation, as the moisture content of the steam limits the amount of work that can be done by the turbine without excessive wear on the turbine blades. By throttling the steam upstream of IP turbine section 16', the expansion line moves into a region of less moisture content.

The second stage pressure is admitted into cross-over pipe 30' from the IP turbine section exhaust to the LP turbine section inlet. To further reduce the moisture content at the LP turbine section in the exemplary preferred embodiment depicted in FIG. 3B, combined cycle plant 50 is designed with secondary steam temperature about 100° F. higher than the cross-over steam temperature in cross-over pipe 30' (i.e. the exhaust of IP turbine section 16'). After the secondary steam is admitted, the LP turbine section inlet temperature increases, which additionally reduces the moisture content in the LP turbine section exhaust.

In combined cycle plant 50, the cross-over steam, combined with the secondary steam, passes through the various stages of LP turbine section 18'. Ultimately, the steam is delivered from the exhaust of LP turbine section 18' to condenser 22' where, condensed into a liquid, it passes back into heat recovery steam generator 56, where it is once again evaporated into main steam (and secondary steam) and supplied to the various turbine sections, completing the steam cycle.

Figure 4:
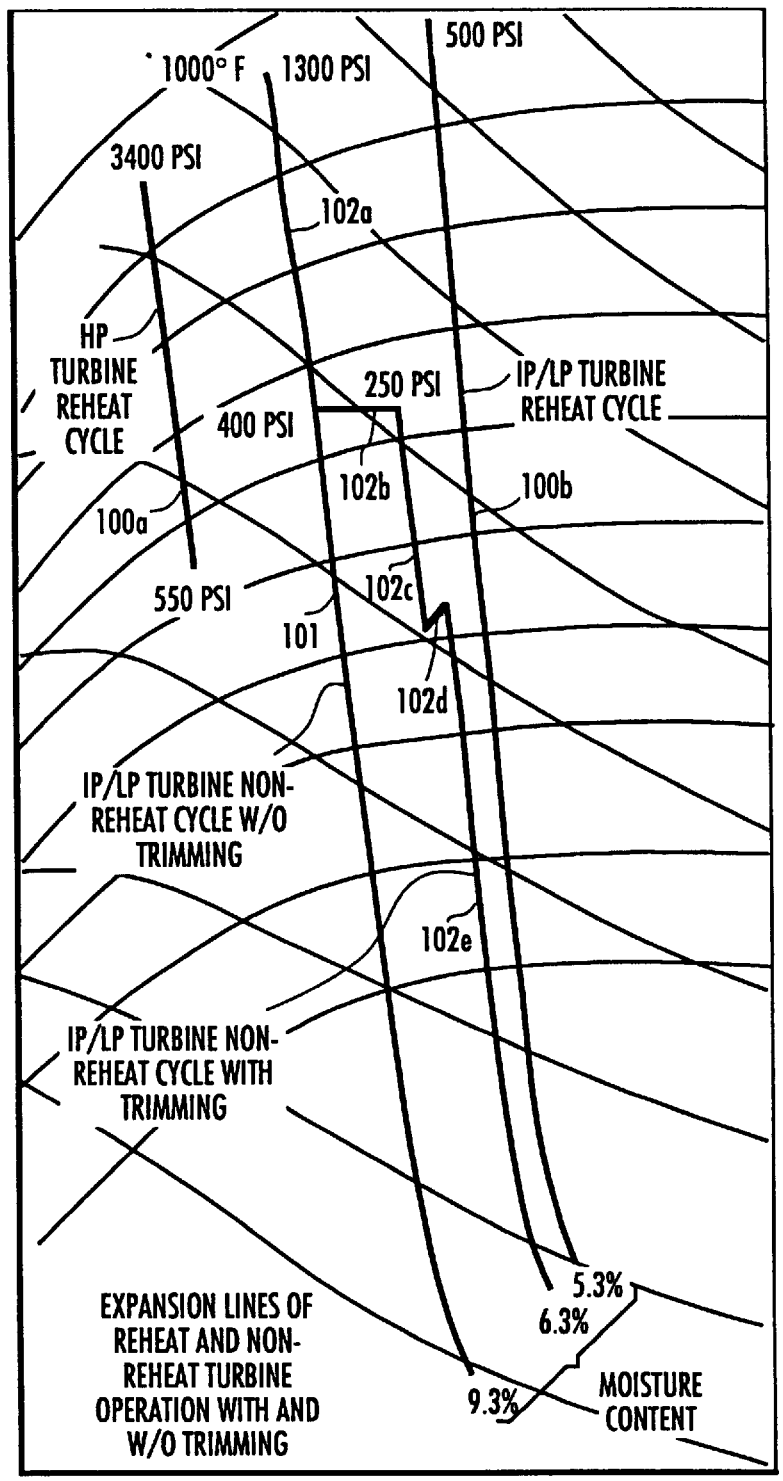
FIG. 4 is a Mollier diagram showing the steam cycle expansion lines of reheat turbine plant operation and non-reheat combined cycle plant operation.

Referring to FIG. 4, the change in operating conditions of the steam turbine system resulting from the exemplary embodiment of a conversion of reheat plant 10 to combined cycle plant 50 (as shown in FIGS. 3A and 3B) is illustrated by the shifting expansion lines in the Mollier diagram. Lines 100a and 100b reflect the operation of reheat plant 10. Line 100a is the expansion line for steam flow through HP turbine section 14; line 100b is the expansion line for steam flow through IP turbine section 16 (after the steam is reheated) and through LP turbine section 18. Line 101 reflects operation of a non-reheat combined cycle plant without trimming system 58 or the introduction of secondary steam.

Lines 102a, 102b, 102c, and 102d, and 102e reflect the operation of combined cycle plant 50 with trimming system 58 and the introduction of secondary steam. Line 102a follows along the upper portion of line 101, the expansion line for steam flow through HP turbine section 14', which is unaffected by trimming system 58 or the introduction of secondary steam. Line 102b demonstrates the effect of trimming system 58, lowering the pressure from 400 psi at the HP turbine section exhaust to 250 psi at the IP turbine section inlet. Line 102c is the expansion line for steam flow through IP turbine section 16'; line 102d demonstrates the effect of the introduction of higher temperature secondary steam into cross-over pipe 30' at the LP turbine section inlet; and line 102e is the expansion line for steam flow through LP turbine section 18'.

As shown by the expansion lines on FIG. 4, the LP turbine section exhaust steam in the reheat cycle of reheat plant 10 had a 5.3% moisture content. The moisture content of the LP turbine section exhaust steam in a non-reheat cycle without trimming system 58 and without the introduction of secondary steam would increase to 9.3%. However, with trimming system 58 and a 100° F. higher secondary steam supply into the cross-over steam, the moisture content of the steam in combined cycle plant 50 will only increase from 5.3% to 6.3% when compared to reheat plant 10. This is shown in FIG. 4, as the installation of trimming system 58 in combined cycle plant 50 moves operation of the non-reheat steam cycle from line 101 to the right, along lines 102b, 102c, 102d, and 102e. The effect of trimming system 58 is therefore to reduce the moisture content at the last stage of LP turbine section 18' and thereby to minimize droplet erosion in the turbine blades.

Line 102*b* for combined cycle plant 50 on the Mollier diagram of FIG. 4 shows a maximum pressure drop between the HP turbine section exhaust and the IP turbine inlet from 400 psi to 250 psi in one embodiment. The maximum pressure drop and corresponding increase in HP turbine section exhaust temperature depends upon the particular embodiment and may be optimized for each specific application. This is done by proper sizing of pipe systems 60 and 62 based on the needs to protect the blading of HP turbine section 14' (i.e. the maximum pressure drop) and based on minimizing moisture content in the LP turbine section 16'.

Other substitutions, modifications, changes and omissions may be made in the design, operating conditions and arrangement of the preferred embodiments without departing from the spirit of the invention as expressed in the appended claims.

What is claimed is:

1. A method for operating a non-reheat combined cycle power plant including a boiler and a steam turbine of a type including a plurality of turbine sections including at least a first turbine section and a second turbine section, the turbine receiving steam under pressure and successively expanding the steam through the turbine sections resulting in a total pressure drop through the turbine, the method comprising the steps of;

adjusting the pressure drop between an exhaust of the first turbine section and an inlet of the second turbine section; and supplying secondary steam to an inlet of a final turbine section in order to increase the overall steam temperature at the inlet of the final turbine section.

2. A trimming system for a steam turbine of a type including a plurality of turbine sections including at least a first turbine section and a second turbine section, the turbine receiving steam under pressure and successively expanding the steam through the turbine sections resulting in a total pressure drop through the turbine, the trimming system comprising:

(a) first fluid conduit coupled at a first end to an exhaust of the first turbine section and at a second end of an inlet of the second turbine section, said first fluid conduit providing non-reheated steam to said second turbine section;

(b) a second fluid conduit coupled to the first fluid conduit forming a bypass between the first end and second end of the first fluid conduit; and (c) a pressure regulator coupled to the second fluid conduit, the pressure regulator being adjustable to selectively adjust a portion of the total pressure drop between the exhaust of the first turbine section and the inlet of the second turbine section.

3. The trimming system of claim 2 wherein the pressure regulator is a valve.

4. A trimming system for a steam turbine of a type including a plurality of turbine sections including at least a first turbine section and a second turbine section, the turbine receiving steam under pressure and successively expanding the steam through the turbine sections resulting in a total pressure drop through the turbine, the trimming system comprising;

adjusting means for selectively adjusting a portion of the total pressure drop between an exhaust of the first turbine section and an inlet of the second turbine section; and means for supplying secondary steam to an inlet of a final turbine section in order to increase the overall steam temperature at the inlet of the final turbine section.

5. The trimming system of claim 4 wherein the adjusting means comprises:

(a) a fluid conduit having a first end connected to the exhaust of the first turbine section and a second end connected to the inlet of the second turbine section; and (b) a pressure regulator coupled between the first and second ends of the fluid conduit to regulate the pressure drop between the exhaust of the first turbine section and the inlet of the second turbine section.

6. The trimming system of claim 4 wherein the pressure regulator is a valve.

* * * * *